United States Patent [19]

Bellanger

[11] Patent Number: 4,760,902
[45] Date of Patent: Aug. 2, 1988

[54] CLUTCH ENGAGEMENT CONTROL SYSTEM

[75] Inventor: Regis Bellanger, Mississauga, Canada

[73] Assignee: Massey-Ferguson Services N.V., Curacao, Netherlands Antilles

[21] Appl. No.: 803,286

[22] PCT Filed: Apr. 1, 1985

[86] PCT No.: PCT/EP85/00143

§ 371 Date: Nov. 22, 1985

§ 102(e) Date: Nov. 22, 1985

[87] PCT Pub. No.: WO85/04697

PCT Pub. Date: Oct. 24, 1985

[30] Foreign Application Priority Data

Apr. 5, 1984 [GB] United Kingdom ................. 8408841

[51] Int. Cl.$^4$ ...................... F16D 25/14; G05D 13/62
[52] U.S. Cl. ............................... 192/0.033; 192/0.076; 192/103 F; 303/95
[58] Field of Search ................. 192/0.033, 0.049, 0.07, 192/0.072, 0.075, 0.076, 0.094, 0.096, 103 F, 12 C; 303/94, 95

[56] References Cited

U.S. PATENT DOCUMENTS

| | | | |
|---|---|---|---|
| 3,752,284 | 8/1973 | Brittain et al. | 192/103 F |
| 4,019,614 | 4/1977 | Prenzel et al. | 192/103 F |
| 4,116,321 | 9/1978 | Miller | 192/103 F |
| 4,343,387 | 8/1982 | Hofbauer | 192/0.076 |
| 4,344,499 | 8/1982 | van der Lely et al. | 192/0.033 X |
| 4,433,746 | 2/1984 | Steel | 180/171 |
| 4,457,411 | 7/1984 | Hiramatsu | 192/0.076 |
| 4,485,443 | 11/1984 | Knödler et al. | 192/0.033 X |
| 4,487,303 | 12/1984 | Boueri et al. | 192/0.052 |
| 4,518,068 | 5/1985 | Oguma et al. | 192/0.052 |

FOREIGN PATENT DOCUMENTS

2066919 7/1981 United Kingdom ............ 192/0.033

Primary Examiner—Rodney H. Bonck
Assistant Examiner—Richard M. Lorence

[57] ABSTRACT

A tractor power take-off drive line which includes a friction clutch (12) which is engaged by a fluid pressure operated actuator (12a) via a solenoid-operated valve (14). The engagement of the clutch is controlled by a system which includes a pulse width modulation function for providing a series of electrical pulses to the solenoid (14a) of the valve in successive predetermined time intervals during engagement of the clutch. Each pulse has an "on" period during which the valve connects the actuator to a source of pressurized fluid and an "off" period during which the valve connects the actuator to a dump line. Sensors (18,19) provide signals indicative of the input and output speeds of the clutch, and a micro processor control circuit (25) establish for successive time intervals the ratio between the intput and output speeds of the clutch and the change in this ratio by comparison with the ratio for a previous time interval. The control circuit compares the change in input to output speed ratio with a target change in this ratio set by the system for the respective time interval to produce an error signal, and uses this error signal to set the ratio of the "on" and "off" periods of the pulse width modulation function for the next successsive time interval. The control circuit also uses the value of the input to output speed ratio to determine the target change in the input to output speed ratio for the next successive time interval so as to adjust the clutch engagement pressure to tend to reduce the error signal to zero.

8 Claims, 5 Drawing Sheets

FIG.1

| $\Delta CTI = 65$ | $KA = 79\%$ | $M = M+1$ |
|---|---|---|
| $\Delta CTO = 50$ | $\Delta KA = 79.0 - 76.9$ $= 2.1\%$ | $\Delta KAT = 10/2.56$ $= 3.9\%$ |
| $KA = 50/65 = 76.9\%$ | $\Delta KAT = 10/2.56$ $= 3.9\%$ | |
| | $\Delta KA/\Delta KAT = 2.1/3.9$ $= .538$ | |
| X | Y | Z |

| M VALUE | 'ON' TIME | M VALUE | 'ON' TIME |
|---------|-----------|---------|-----------|
| 0 | OFF | 8 | 41.6 ms |
| 1 | 15 ms | 9 | 45.4 |
| 2 | 18.8 | 10 | 49.2 |
| 3 | 22.6 | 11 | 53.0 |
| 4 | 26.4 | 12 | 56.8 |
| 5 | 30.2 | 13 | 60.6 |
| 6 | 34.0 | 14 | 64.4 |
| 7 | 37.8 | 15 | ON |

| TABLE OF M VALUES | |
|---|---|
| $\Delta KA/\Delta KAT$ | NEW M VALUE |
| $\Delta KA/\Delta KAT > 2.5$ | $M - 2$ |
| $2.5 > \dfrac{\Delta KA}{\Delta KAT} > 1.25$ | $M - 1$ |
| $1.25 > \dfrac{\Delta KA}{\Delta KAT} > 1.00$ | $M$ |
| $1.00 > \dfrac{\Delta KA}{\Delta KAT} > 0.50$ | $M + 1$ |
| $0.5 > \dfrac{\Delta KA}{\Delta KAT}$ | $M + 2$ |

FIG.6

| FOR FOLLOWING KA% RANGES | ΔKAT NORMAL | ΔKAT HEAVY DUTY |
|---|---|---|
| 0 – 10 | 5 | 6 |
| 10 – 20 | 10 | 6 |
| 20 – 30 | 10 | 6 |
| 30 – 40 | 10 | 6 |
| 40 – 50 | 10 | 6 |
| 50 – 60 | 10 | 6 |
| 60 – 70 | 10 | 6 |
| 70 – 80 | 10 | 6 |
| 80 – 90 | 5 | 6 |
| 90 – 100 | 5 | 6 |

CLUTCH ENGAGEMENT CONTROL SYSTEM

TECHNICAL FIELD

This invention relates to friction clutches of the type, hereinafter referred to as being of the type specified, in which the clutch has an input portion which receives a driving input and an output portion for connection with a component to be driven by the clutch, the clutch being engaged by fluid pressure supplied from a pressure source via a solenoid-operated valve.

Clutches of the type specified are frequently used, for example, in tractor power take-off (PTO) drive lines to connect and disconnect a power take-off (PTO) shaft from the engine.

Problems arise with such clutches when used in a PTO drive line since if the clutch is engaged too quickly high shock loading can occur which will damage the drive line or any implement connected thereto and if the clutch is too slowly engaged excessive slippage will occur which can damage the clutch due to excessive heat build-up.

DISCLOSURE OF THE INVENTION

It is an object of the present invention to provide an improved tractor power take-off drive line including a friction clutch of the type specified in which the above clutch engagement problems are at least mitigated.

Thus according to the present invention there is provided a tractor power take-off drive line including a friction clutch having an input portion which is driven from an engine and an output portion which drives a power take-off output shaft, fluid pressure operated clutch engaging means, a solenoid-operated valve for supplying pressurised fluid to the engaging means, and a system for controlling the engagement of the clutch, said system comprising a pulse width modulation function for providing a series of electrical pulses to the solenoid of the valve in successive predetermined time intervals during engagement of the clutch, each pulse having an "on" period during which the valve connects the engaging means to a source of pressurised fluid and an "off" period during which the valve connects the engaging means to a dump line, sensing means to provide signals indicative of the input and output speeds of the clutch, and processing means for establishing for successive time intervals the ratio between the input and output speeds of the clutch and the change in this ratio by comparison with said ratio for a previous time interval, said processing means comparing said change in input to output speed ratio with a target change in said ratio set by the system for the respective time interval to produce an error signal, and using said error signal to set the ratio of the "on" and "off" periods of the pulse width modulation function for the next successive time interval, said processing means also using the value of the input to output speed ratio to determine the target change in said input to output speed ratio for the next successive time interval so as to adjust the clutch engagement pressure to tend to reduce said error signal to zero.

Preferably during engagement of the clutch the processing means also compares the input speed of the clutch for the current time interval with the initial input speed of the clutch at the commencement of engagement of the clutch, and switches control of the system to comparison with a heavy duty target change in the input to output speed ratio if the input speed for the cuttent time interval is less then the initial clutch input speed by more than a first predetermined factor.

Typically the first predetermined factor may be 12.5%.

Preferably during engagement of the clutch the processing means also compares the input speed of the clutch for the current time interval with the initial input speed at the commencement of the engagement of the clutch, and initiates disengagement of the clutch if the input speed for the current time interval is less than the initial clutch input speed by more than a second larger predetermined factor (indicating a potential stall condition). Typically the second predetermined factor may be 50 percent. Alternatively the second predetermined factor can be defined in r.p.m. terms, for example, a decrease of 500 r.p.m.

The invention further provides a method of controlling a PTO output shaft brake comprising applying the brake for a predetermined time period, determining whether the speed of rotation of the output shaft at the end of said predetermined time is below a predetermined value indicative of the presence of a low inertial load on the shaft which can be arrested by the brake without damage, maintaining the brake continuously applied to bring the shaft to rest if the output shaft speed is below said predetermined value at the end of said predetermined time period or releasing the brake if the output shaft speed is above said value, in the event of the brake being released due to said shaft speed being above said predetermined value, the brake being re-applied after a second predetermined time period and the above process repeated until the rotational speed of the shaft is below said predetermined value whereupon the brake is continuously applied.

DESCRIPTION OF THE DRAWINGS

The invention will now be described, by way of example only, with reference to the accompanying drawings in which.

BEST MODE OF CARRYING OUT THE INVENTION

Figure 1:
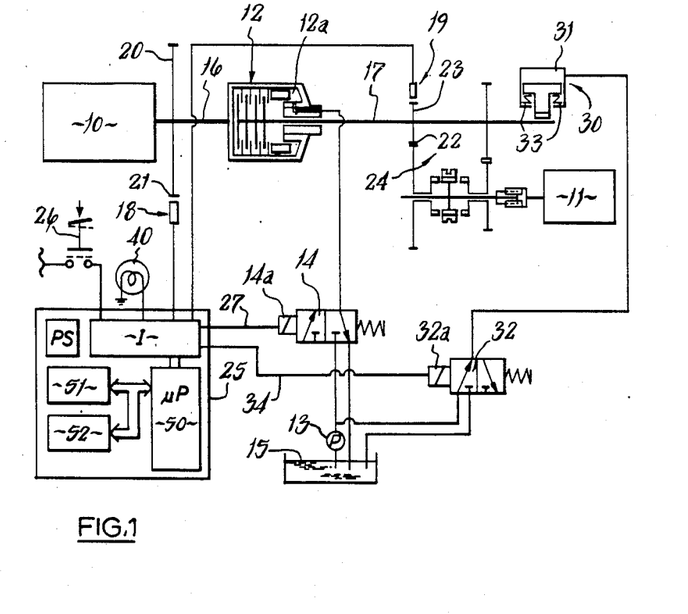
FIG. 1 is a diagrammatic representation of a clutch engagement control system in accordance with the invention.

Referring to FIG. 1 this shows a diagrammatic representation of a PTO drive line for a tractor in which an engine 10 drives an implement 11 via a PTO clutch 12 and a twospeed gear set 24. Clutch 12 is engaged by fluid pressure supplied by a pump 13 via a solenoid-operated valve 14 and is disengaged by spring means (not shown) when the clutch is vented to a sump 15 by valve 14.

The precise constructional details of clutch 12 form no part of the present invention and will not therefore be described in detail. Any known form of PTO clutch of the necessary torque capacity could be used. For example, the multi-plate type of PTO clutch currently used on the Massey-Ferguson 2000 Series tractors in which pressuriation of an annular chamber 12a engages the clutch.

The solenoid valve 14 is also of known form and has two positions. When in the "off" position shown in which the solenoid is not energised the clutch is disengaged since chamber 12a is vented to sump 15. When in the "on" position the solenoid is energised and the valve is displaced to its other position in which the clutch is connected with the pump 13 to pressurise chamber 12a and engage the clutch.

Two sensing devices 18 and 19 are provided to sense the speed of rotation of the shaft 16 which acts as the input into clutch 12 and shaft 17 which acts as the output of the clutch. These sensing devices may be of any suitable form and again the precise constructional details of these devices do not form part of the present invention. For example, the sensing devices may be of the known electromagnetic type in which a specially provided toothed disc rotates with each shaft and the passage of the teeth of this disc past a coil induces a pulsating voltage in the coil circuit whose frequency of pulsation is a measure of the speed of rotation of the associated shaft.

Ideally, the provision of special toothed discs to provide the clutch input and output speed indications is to be avoided and as shown, for example, the starter motor teeth 21 on the outer periphery of the engine flywheel 20 can be utilised as part of the sensing device 18 and the teeth 22 on a gear wheel 23 which forms part of two speed gear set 24 can be utilised as part of sensing device 19.

The pulse counts coming from sensing devices 18 and 19 are fed as inputs into a micro-processor control circuit indicated generally at 25. The control circuit is shown diagrammatically as comprising a microprocessor 50, ROM 51 and RAM 52, a power supply PS and an input/output interface I. It will be appreciated that microprocessors could be used (eg the Intel 8049) within the necessary memory on-board thus obviating the need for separate ROM and RAM chips.

The control circuit also receives an input signal from a driver-operated push-on/ push-off switch 26 which the driver depresses when he wishes to engage the PTO clutch 12. A warning light 40 is illuminated when the switch 26 is closed to engage the PTO clutch. If the control circuit 25 initiates disengagement of clutch 12 whilst switch 26 is in the "on" mode the light 40 will flash to warn the driver that his command is being overriden. The control circuit communicates with the solenoid 14a of valve 14 via an output line 27.

A PTO brake is provided and is indicated diagrammatically at 30. The brake is applied by pressurising brake chamber 31 with fluid pressure from pump 13 via solenoid-operated valve 32 and is released by spring force diagrammatically indicated at 33 when chamber 31 is vented to the sump 15 by energising the solenoid 32a of valve 32. Brake 30 is of a relative small capacity and is designed to be capable of braking the rotating shafts and other components within the tractor on the output side of clutch 12 when clutch 12 has been disengaged and is not capable of breaking any implement of large inertia which may be attached to the PTO drive line. Control circuit 25 communicates with the solenoid 32a of valve 32 via an output line 34 and the operation of clutch 12 and brake 32 are interlocked within circuit 25 so that when engagement of clutch 12 is initiated disengagement of brake 32 has been initiated and vice versa.

The control system of the present invention sets out to provide a progressive and shock-free engagement of the PTO clutch 12 by controlling the rate of increase of the pressure applied to the clutch by the valve 14 which in turn controls the rate at which the speed of rotation of the input and output shafts 16 and 17 are equalized.

The control system achieves the above objective by setting target levels for rate of change in the ratio of the clutch input and output speeds during the clutch engagement process, by monitoring the actual levels of the rate of change in the ratio of the clutch input and output speeds and by adjusting the rate of increasing in clutch pressure dependent on the error between the actual and target rate of change in the input and output speed ratio.

The Applicant's experience has shown that when a PTO clutch is hooked-up to an implement with a high power consumption or inertia (hereinafter referred to as a heavy duty implement) the target level of rate of change in speed ratio for the output shaft 17 can be held constant during the clutch engagement process as explained in more detail below. The control system is arranged to detect when a heavy duty implement has been hooked-up by continualy comparing the current engine speed (from sensing device 18) with the engine speed when the clutch engagement process commenced. If the current engine speed falls by more than some first predetermined factor, say 12.5%, from its initial valve the system is taken to be connected to a heavy duty implement and switches to its so-called "heavy duty mode" in which a constant target level of rate of change in speed ratio is set for the clutch output shaft 17.

The Applicant's experience has shown that when a PTO clutch is operating in its so-called "normal duty mode", that is when it is hooked-up to a normal or lighter implement (i.e. an implement with a more normal or lighter power consumption or inertia and which does not cause the engine speed to fall by the first predetermined level of say 12.5%) it is desirably to vary the target level of rate of change in speed ratio set for the clutch output shaft 17 basically in three phases.

Thus, as explained below, in the inital engagement phase of the PTO clutch (say when the output shaft speed is below 10% of the input shaft speed) a lower level of target rate of change in speed ratio is set for the output shaft 17 so that there is a slow increase in the output shaft speed to allow the gradual take-up of all free play in the PTO drive line.

In the intermediate phase of the PTO clutch enegagement (say when the clutch outut shaft is between 10 and 80% of the input shaft speed) a higher lever of target rate of change in speed ratio is set for the output shaft 17 so that there is progressive and quick increase in output shaft speed (progressive to protect the shafts and quick to protect the clutch from excessive heat due to slippage).

In the final phase of the PTO clutch engagement (say when the clutch output shaft speed is above 80% of the clutch input shaft speed) a lower level of target rate of change in speed ratio (e.g. the same as that applied during the initial engagement period) is set for the output shaft so that a smooth lock-up of the clutch takes place and allows the shafts to untwist before full speed equalisation. If this is not done, energy stored in the shafts will be suddenly released causing drive line shocks due to free play in the drive line.

Figure 3:
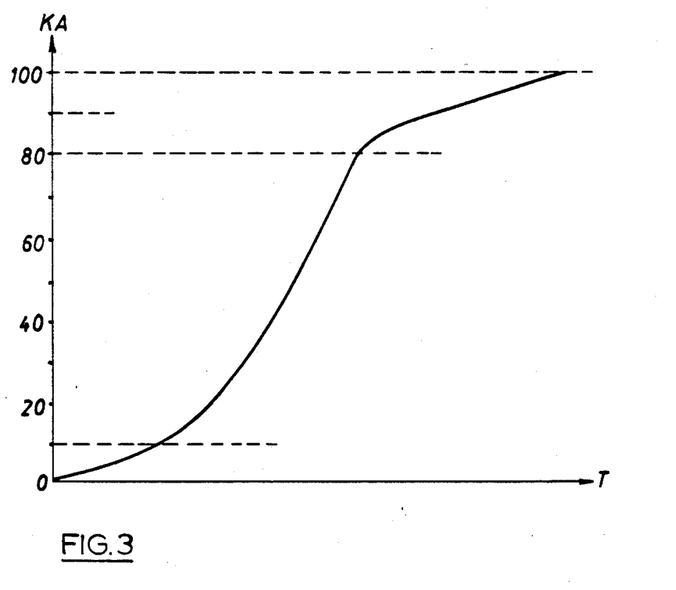
FIG. 3 shows graphically the desired general form of the speed curve for the rate of equalisation of the clutch input and output speeds for a control system in accordance with the present invention when operating in its normal duty mode.

Operation of the control system by variation of the target level of rate of change in speed ratio in three phases as described above results in a speed curve for the equalisation of the PTO clutch input and output speeds of the general form shown in FIG. 3. The vertical axis of the curve of FIG. 3 is the ratio (KA) of the output speed/input speed expressed as a percentage (so that the curve is independent of engine setting) and the horizontal axis is the time axis (T) with a maximum clutch engagement time of, say, two seconds. As will be appreciated when output speed/input speed ratio KA is zero the output shaft 17 is stationary and when the ratio KA is 100% the output shaft is rotating at the same speed as the input shaft 16.

When engagement of clutch 12 is initiated by the driver pressing buttom 26 the following sequence of events occurs:

1. The light 40 is illuminated, the PTO brake solenoid 32a is energised to disengage brake 30, and the clutch solenoid 14a is energised to commence pressurisation of the clutch 12.

Figure 2:
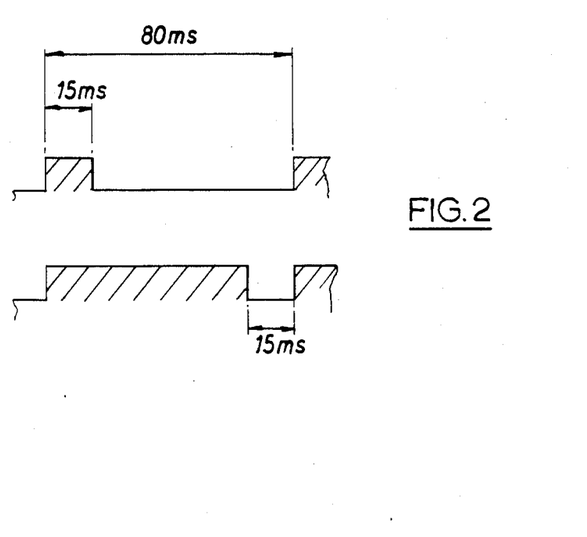
FIG. 2 illustrates a typical range of on/off periods used in the pulse width modulation system of the present invention.

2. A given time after button 26 is pressed (this time is typically say 400 ms and is arranged to be such that clutch 12 will not be pressurised to a level at which output shaft 17 has commenced rotation) the clutch control valve 14 is oscillated at high frequency between its "off" and "on" conditions in order to control the rate of build up of pressure in clutch 12. This is done, as will be described in detail below, by supplying to solenoid 14a a series of high frequency pulses from control circuit 25 via line 27. These pulses are supplied at a constant rate of say 80 ms (0.08 seconds) and each pulse consists of an "on" and "off" period whose combined duration is fixed at 80 ms but whose relative duration can be varied by the so-called pulse width modulation technique in control circuit 25 between set limits of, say 15 ms "on" 65 ms "off" to 65 ms "on" 15 ms "off" (see FIG. 2 in which the "on" periods are shown shaded). The response time of the solenoid valve is by comparison typically 20 ms. Initially the "on" and "off" period of the pulses remains constant at a given predetermined ratio (e.g., 18.8 ms "on" and 61.2 ms "off" corresponding to an M valvue of 2 as described below). 3. When the first pulse is detected at sensing device 19, indicating that the rotation of output shaft 17 has commenced, the "on" and "off" duration of the pulses supplied to solenoid 14a is varied in a manner which controls the rate of build up of the pressure in clutch 12 so that the rate of increase in the clutch output shaft speed 17 is controlled in accordance with the target levels of rate of change in speed ratio set by the system (as referred to above) so that the output speed of clutch 12 equalises with the input speed by following a speed curve generally of the form shown, for example, in FIG. 3. 4. When the clutch output speed is within 5% of the clutch input speed, which is determined by comparing the signals from sensing devices 18 and 19, the solenoid 14a is continuously energised to lock-up the clutch 12 by a continuous "on" signal which is relayed via line 27.

Stage 3 of the clutch engagement process referred to above will now be described in greater detail.

The system counts the pulses coming from input speed sensing device 18 in circuit 25. This count is referred to hereinafter as CTI. In a similar fashion the pulses coming from clutch output speed sensing device 19 are counted and referred to hereinafter as CTO.

The control circuit operates in time intervals $\Delta T$ of 80 ms as stated above and using counts CTI and CTO the number of pulses coming from the sensing devices 18 and 19 during each successive time interval (hereinafter designated $\Delta CTI$ and $\Delta CTO$ respectively) can be computed.

As will be appreciated the counts $\Delta CTO$ and $\Delta CTI$ are representative of the average speeds of the shafts during the time interval in question and the speed ratio $\Delta CTO/\Delta CTI$ is the vertical axis variable KA in FIG. 3.

The control system operates on fixed time intervals of 80 ms. Thus the target rate of change in the ratio of the input and output speeds to apply during a given 80 ms time interval can be specified simply by specifying the target change ($\Delta KAT$) in the KA ratio which is to apply during that time interval. Thus, the target levels of rate of change in speed ratio during the clutch engagement process can be stored in the control circuit memory as two series of incremental changes $\Delta KAT$ in the value of the speed ratio KA, the value of these changes in speed ratio being dependent on the percentage value of KA. These $\Delta KAT$ values are shown as two columns in FIG. 4. One series of values of $\Delta KAT$ (the left hand column) are used by the circuit during "normal mode" operation and exhibit the three phase form described above, while a second series of values of $\Delta KAT$ (the right hand column) are used by the circuit when operating in the "heavy duty mode" and, as described above, remain constant. [The $\Delta KAT$ values can be converted into percentage values by dividing the FIG. 4 values by 2.56.]

When, for example, using an 8-bit microprocessor in control circuit 25 the variable KA is arranged to vary from 0 to 255 (00 to FF in hexadecimal notation) with the 0 denoting 0% and the value 255 denoting 100% for the KA variable.

The actual KA value for each time interval is obtained by dividing the pulse count obtained from output shaft sensing device 19 during the time period by the pulse count obtained from input shaft sensing device 18 for the period and multiplying the result by a constant factor so that the range of KA is from 0 to 255.

The microprocessor 50 of control circuit 25 also provides a pulse generating function which generates pulses at a rate of 80 ms and whose wave form "on"/"off" duration is within the limits described above and shown pictorially in FIG. 2. These pulses are fed to solenoid 14a via line 27, as referred to above, to oscillate the solenoid valve between its "on" and "off" conditions and thus control the build-up of pressure in clutch 12.

Figure 5:
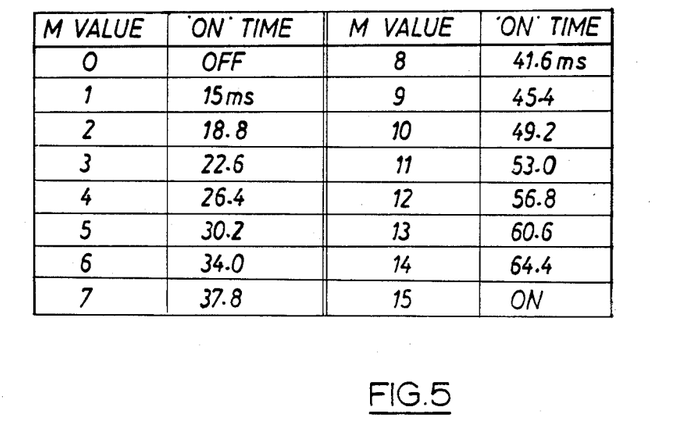
FIG. 5 shows the pulse width modulation range split into M values.

The full pulse width range is subdivided into a number of equal increments as shown in tabular form in FIG. 5. The increment chosen is 3.8 ms but this increment could be different and is determined by the internal timing of the control circuit. As will be seen from FIG. 5 the various "on"/"off" ratios are designated as various M values. For example, an M value of 2 corresponds to 18.8 ms "on" 61.2 ms "off".

The control circuit is set up so that at the beginning of the clutch engagement process an M value of 2 is chosen and a ΔKAT value of 5.

During a given clutch engagement process at the end of each time interval the KA ratio for that time interval is computed (call this KA NEW). From this value is subtracted the KA value for the previous time interval (call this KA OLD) to give the actual change in KA (call this ΔKA) for the time interval. This is ΔKA=KA NEW−KA OLD. The actual value ΔKA of the change in speed ratio is then compared with the target value ΔKAT for this speed ratio change for that interval as the ratio ΔKA/ΔKAT.

Figure 6:
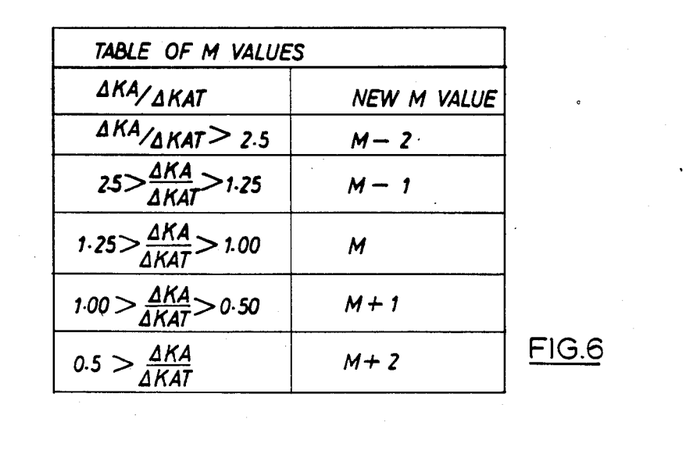
FIG. 6 shows in tabular form the M values allotted to given $\Delta KA/\Delta KAT$ ranges.

This comparison ratio ΔKA/ΔKAT is a measure of how closely the actual rate of change in speed ratio achieved by the control system has matched the target rate of change in speed ratio and provides an error signal which is used to determine the M value (that is the pulse width ratio) for the next time interval from the relationship shown in FIG. 6 which is stored in the control system.

For example, if the ΔKA/ΔKAT ratio is between 1.25 and 2.50 the new M value is the previous M value minus 1 and this determines the pulse width form to be applied during the next time interval and hence the average level of clutch engagement pressure and thus the rate of change in speed ratio which will be applied.

Figure 4:
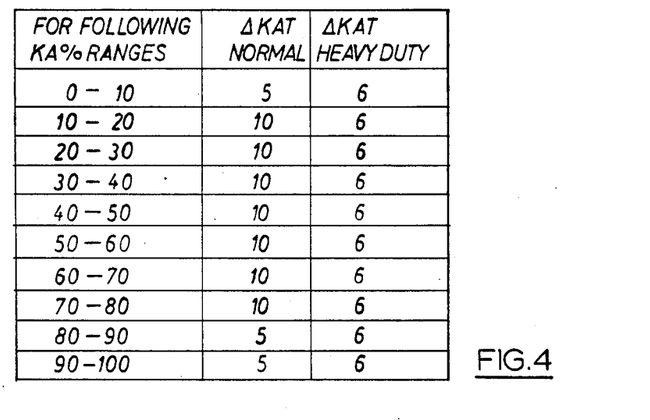
FIG. 4 shows in tabular form the target changes ($\Delta KAT$) in KA value for given percentage ranges of measured KA values.
Figure 7:
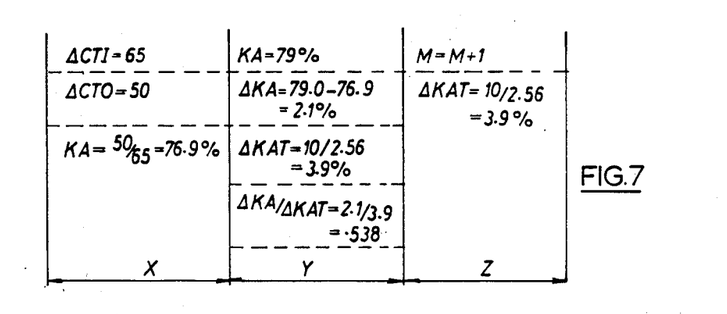
FIG. 7 diagrammatically illustrates the determination of certain control system operating parameters in successive system time intervals.

Thus if we consider the operation of the control circuit within successive time intervals X, Y and Z (as shown diagrammatically in FIG. 7) with ΔCTO and ΔCTI values for time interval X of say 50 and 65 pulses respectively we have a KA value for time interval X of 50/65 i.e. 76.9%. Thus the target value ΔKAT for the next time interval Y from FIG. 4 is 10/2.56, i.e. 3.9%.

If, for example, the KA value at the end of time interval Y is 79% this gives a ΔKA value of 79.0−76.9=2.1% for time interval Y. Thus the error signal ΔKA/ΔKAT for time interval Y is 2.1/3.9=0.538. This gives an M value from FIG. 6 of M+1 for the next time interval Z. Interpreting this situation it will be observed that since the ΔKA value did not reach the target value ΔKAT set for time interval Y the M value has been increased to increase the average clutch pressure and hence the level of acceleration applied to the clutch output shaft 17 during the next time interval.

As before the ΔKAT value for time interval Z is given from FIG. 4 and is again (10/2.56)%. Thus, the control system continues to operate in this manner with the pulse width being adjusted so as to tend to reduce the ΔKA/ΔKAT ratio to unity.

As will be appreciated, in any control system in accordance with the present invention the target levels of rate of change in speed ratio which are to be set for the clutch output shaft 17 during a clutch engagement process (and hence the resultant speed curve) are easily determined by experiment for each clutch design and potential load range to which the system is to be applied in order to achieve the required progressive and shock-free engagement of the clutch design in question. Once the target rate of change in speed ratio profile for a given clutch design has been determined the control circuit 25 can be manufactured as a custom-built microprocessor.

As indicated above, throughout the clutch engagement process the control circuit monitors the clutch input speed. If the input speed falls by more than some first predetermined factor of say 12.5% from its initial value the control circuit is arranged to switch to using the heavy duty value of ΔKAT from FIG. 4.

The circuit also monitors whether the input speed of the clutch ever decrease by more than a second and larger predetermined factor (e.g., 50% or 500 r.p.m.) from its initial value (indicating a potential stall condition). If this condition is detected the control circuit terminates engagement of the PTO clutch and flashes warning light 40 to warn the operator.

The control system algorithm also caters for the situation when the operator attempts to re-engage the PTO clutch whilst the output shaft 17 is still rotating. The system monitors the KA ratio for each time interval and as long as the KA value is not re-increasing the system uses a fixed pulse width modulation equivalent to M=8. As soon as the system detects that the KA value is re-increasing (indicating that the clutch is again beginning to drive the output shaft) then the system reverts to the normal algorithm. This prevents shock loading of the output shaft on reengagement of the PTO clutch before the output shaft has stopped rotating following a previous operation.

Figure 8:
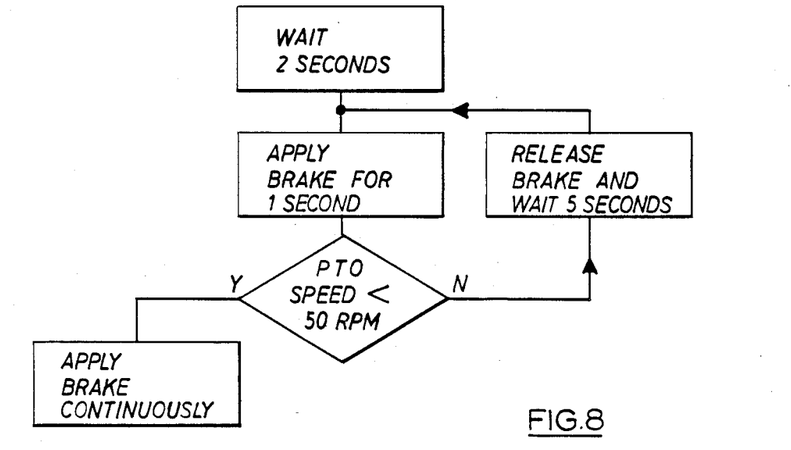
FIG. 8 is a diagrammatic representation of the algorithm for the operation of a power take-off shaft brake also provided by the invention.

As previously described, the PTO brake 30 is not capable of braking any large inertial implement which may be connected to the PTO drive line. The algorithm for the operation of the brake is shown in FIG. 8. This algorithm is executed by control circuit 25.

When the clutch is disengaged a two second delay occurs before value 32 applies brake 30. The brake is initially applied for one second and the speed of the PTO shaft 17 is then sensed using device 19. If the shaft speed is less than some predetermined value (say 50 r.p.m.) which indicates that no large inertia is coupled with shaft 17, the brake is maintained continuously applied. If, however, the speed of shaft 17 is above the predetermined value the brake is released and after some predetermined time (say five seconds) the brake is again applied for one second and the above precesses repeated until the shaft speed eventually falls below 50 r.p.m. when the brake is continuously applied.

Although the invention has been described above in terms of a digital circuit in which all the control functions are carried out by microprocessor 50 it will be understood that the invention can be realised using an analogue approach.

Figure 9:
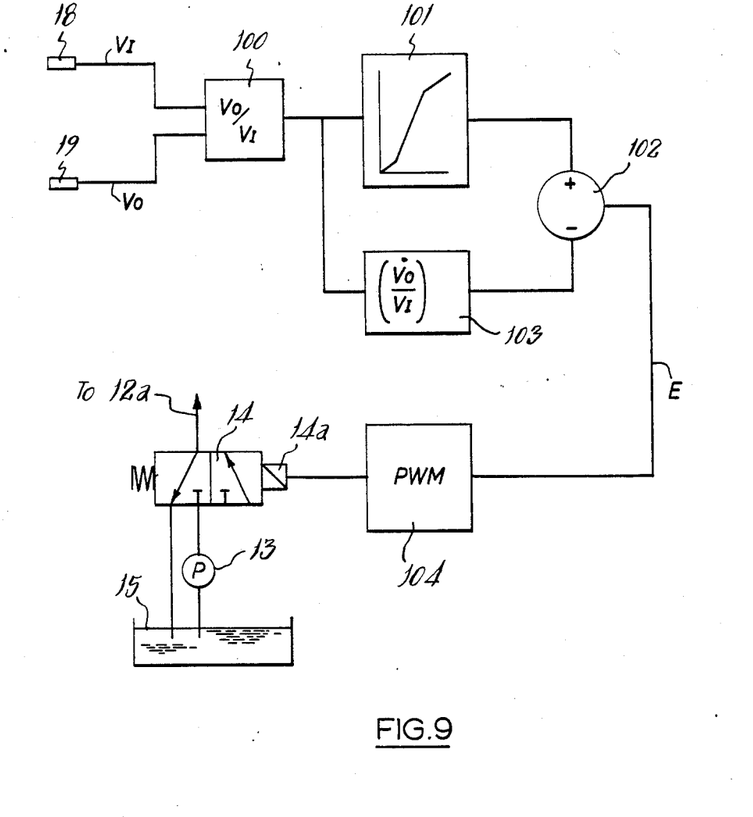
FIG. 9 shows a block diagram of part of an analogue form of control system in accordance with the invention.

FIG. 9 shows a block diagram of part of such an analogue system.

In FIG. 9 sensing devices 18 and 19 generate voltages VI and VO respectively which are a measure of the input and output speed of the clutch at any instant.

These voltages are compared in comparator 100 to produce a speed ratio VO/VI which is the equivalent of the KA ratio referred to above in the digital system.

This VO/VI ratio is then fed as an input into a target setting device 101 which produces as its output a signal representing a target rate of change in the ratio of the input and output speeds which would be constant if the system was in this heavy duty mode or which would vary in three phases dependent on whether the input ratio of VO/VI is in the below 10%, between 10 and 80%, or above 80% phase of the VO/VI speed curve as described above in relation to the digital system.

This target rate of change in speed ratio level is fed as an input into a comparator 102 together with an actual rate of change in speed ratio signal which is obtained by differentiating the ratio VO/VI in a differentiator 103.

The error signal output E from comparator 102 is used to control a pulse width modulating circuit 104 which in turn controls solenoid valve 14 to control the clutch pressure so as to tend to reduce the error signal from comparator 102 to zero.

I claim:

1. A tractor power take-off drive line including a friction clutch having an input portion which is driven from an engine and an output portion which drives a power take-off output shaft, fluid pressure operated clutch engaging means, a solenoid-operated valve for supplying pressurised fluid to the engaging means, and a system for controlling the engagement of the clutch, said system comprising a pulse width modulation function for providing a series of electrical pulses to the solenoid of the valve in successive predetermined time intervals during engagement of the clutch, each pulse having an "on" period during which the valve connects the engaging means to a source of pressurized fluid and an "off" period during which the valve connects the engaging means to a dump line, sensing means to provide signals indicative of the input and output speeds of the clutch, and processing means for establishing for successive time intervals the ratio between the input and output speeds of the clutch and the change in this ratio by comparison with said ratio for a previous time interval, said processing means comparing said change in input to output speed ratio with a target change in said ratio set by the system for the respective time interval to produce an error signal, and using said error signal to set the ratio of the "on" and "off" periods of the pulse width modulation function for the next successive time interval, said processing means also using the value of the input to output speed ratio to determine the target change in said input to output speed ratio for the next successive time interval so as to adjust the clutch engagement pressure to tend to reduce said error signal to zero.

2. A tractor power take-off drive line according to claim 1 in which during engagement of the clutch the processing means also compares the input speed of the clutch for the current time interval with the initial input speed of the clutch at the commencement of engagement of the clutch, and switches control of the system to comparison with a heavy duty target change in the input to output speed ratio if the input speed for the current time interval is less than the initial clutch input speed by more than a first predetermined factor.

3. A drive line according to claim 1 in which if engagement of the clutch is initiated whilst the clutch output portion is still rotating from a previous clutch engagement, the solenoid operated valve is arranged to operate at a predetermined "on" to "off" period ratio until the speed of the output portion again begins to increase whereupon the system reverts to operation in response to said error signal.

4. A drive line according claim 2 characterised in that the first predetermined factor is 12.5%.

5. A drive line according to calim 1 in which during the engagement of the clutch the processing means also compares the input speed of the clutch for the current time interval with the intial input speed at the commencement of engagement of the clutch, and initiates disengagement of the clutch if the input speed for the current time interval is less than the initial clutch input speed by more than a second larger predetermined factor.

6. A drive line according to claim 5 characterised in that the second predetermined factor is 50%.

7. A drive line according to claim 1 having a PTO output shaft brake and a brake control system comprising brake applying means, means for sensing the speed of rotation of the output shaft and a brake control means which applies the brake for a predetermined time period and then determines whether the speed of rotation of the output shaft is below a predetermined value indicative of the presence of a low inertial load on the shaft which can be arrested by the brake without damage, the brake being continuously applied by the control means if the shaft speed is below said value at the end of said period or being released if above said value, in the event of the brake being released, the brake being reapplied after a second perdetermined time period and the above process repeated until the rotational speed of the shaft is below said predetermined value.

8. A method of controlling a PTO output shaft brake comprising applying the brake for a predetermined time period, determining whether the speed of rotation of the output shaft at the end of said predetermined time is below a predetermined value indicative of the presence of a low inertial load on the shaft which can be arrested by the brake without damage, maintaining the brake continuously applied to bring the shaft to rest if the output shaft speed is below said predetermined value at the end of said predetermined time period or releasing the brake if the output shaft speed is above said value, in the event of the brake being released due to said shaft speed being above said predetermined value, the brake being re-applied after a second predetermined time period and the above process repeated until the rotational speed of the shaft is below said predetermined value whereupon the brake is continuously applied.

* * * * *